United States Patent [19]

Weir

[11] 3,795,811

[45] Mar. 5, 1974

[54] METHOD AND MEANS FOR EQUALIZING THE RESPONSE OF SIGNAL CHANNELS IN A MULTIPLE CHANNEL IMPROVED SYSTEM

[75] Inventor: Donald E. Weir, Harbor City, Calif.

[73] Assignee: The United States of America as represented by the Secretary of the Air Force, Washington, D.C.

[22] Filed: Mar. 20, 1973

[21] Appl. No.: 343,061

[52] U.S. Cl. .................. 250/339, 250/350, 250/226

[51] Int. Cl. .................. G01t 1/12

[58] Field of Search ........... 250/209, 226, 339, 350; 356/51

[56] References Cited

UNITED STATES PATENTS

| | | | |
|---|---|---|---|
| 3,174,045 | 3/1965 | Whitney | 250/209 |
| 3,089,382 | 5/1963 | Hecht et al. | 250/226 |
| 3,521,958 | 7/1970 | Treharne | 250/226 |
| 3,675,019 | 7/1972 | Hill et al. | 250/350 |

*Primary Examiner*—James W. Lawrence
*Assistant Examiner*—Harold A. Dixon

[57] ABSTRACT

Automatic responsivity control in a multiple channel infrared system is realized by means of reference signals derived from a modulated light source. The light source illuminates both the infrared element array and a separate reference signal detector. The infrared video signal and the reference signals transmitted in each infrared system channel are passed through a variable gain amplifier. The gain of the variable gain amplifier (and hence the magnitude of the reference signal) is controlled by a circuit including a synchronous filter, a synchronous detector, a DC reference voltage source, and a voltage controlled resistor. The separate reference signal detector provides drive signals to control the synchronous filter and also provides a 180° phase shifted reference signal that is used to cancel the reference signal in the output of the variable gain amplifier.

2 Claims, 5 Drawing Figures

METHOD AND MEANS FOR EQUALIZING THE RESPONSE OF SIGNAL CHANNELS IN A MULTIPLE CHANNEL IMPROVED SYSTEM

BACKGROUND OF THE INVENTION

This invention relates to multiple channel infrared detection systems, and in particular to automatic responsivity control means for equalizing the response of signal channels in such systems.

State-of-the-art automatic-responsivity-control systems utilize a low-frequency reference signal. When infrared-detector elements with long-time-constants are used in such a system, a low-frequency automatic responsivity control will not properly equalize the responsivities. The use of a higher frequency reference signal (within the frequency pass band of the system) effectively overcomes this limitation.

However, the primary difficulty encountered in realizing a system that utilizes high frequency reference signals lies in the separation of video signal and reference signal information. In an infrared system, the desired signals are usually in the form of video pulses with information lying at frequencies up to 25 KHz. The reference signal is a sine wave with a frequency in the band required to transmit the pulse. This reference signal must be attenuated after use to prevent interference with normal system detection processes. The signal may be cancelled by summing it with an out of phase signal; however, the cancellation is limited to approximately 20 decibels maximum due to the difficulty of maintaining the required 180° phase relationship. Thus, it is required to maintain the reference signal amplitude at approximately the rms noise level of the video channels. For a system with a large dynamic range, the amplitude of the video signals may then be several thousand times the amplitude of the reference signal.

SUMMARY OF THE INVENTION

Reference signals for the automatic responsivity control system described herein are provided by a light source and an intercepting motor driven chopper wheel. This modulated light is relayed optically so as to uniformly illuminate the infrared system detector array without interfering with the video signals to the array. A separate reference pickoff is also provided which contains only the high signal-to-noise reference signal. The reference signal frequency is determined by the number of chopper spokes and the rotation speed. The automatic responsivity control channels carry both video signals and reference signals and the output of each channel is passed through a variable gain amplifier. The reference pickoff feeds a reference signal drive generator that generates control drive signals and a 180° phase shifter reference signal. A synchronous filter and synchronous detector in response to the control drive signals provide a signal that is compared with a DC reference voltage. The resultant difference signal is used to control the gain of the variable gain amplifier. The circuit operates in such a manner that the reference signal out of the variable gain amplifier is of the appropriate magnitude for cancellation by the 180° phase shifted reference signal.

It is a principal object of the invention to provide a new and improved method and means for equalizing the response of signal channels in a multiple channel infrared system.

It is another object of the invention to provide, for a multichannel infrared system, an automatic responsivity control circuit that utilizes high frequency reference signals.

It is another object of the invention to provide, for a multichannel infrared system, an automatic responsivity control circuit having improved video and reference signal separation capabilities.

These, together with the objects, features and advantages of the invention will become more readily apparent from the following detailed description taken in conjunction with the illustrative embodiment in the accompanying drawings.

DETAILED DESCRIPTION OF THE PREFERRED EMBODIMENT

Figure 1:
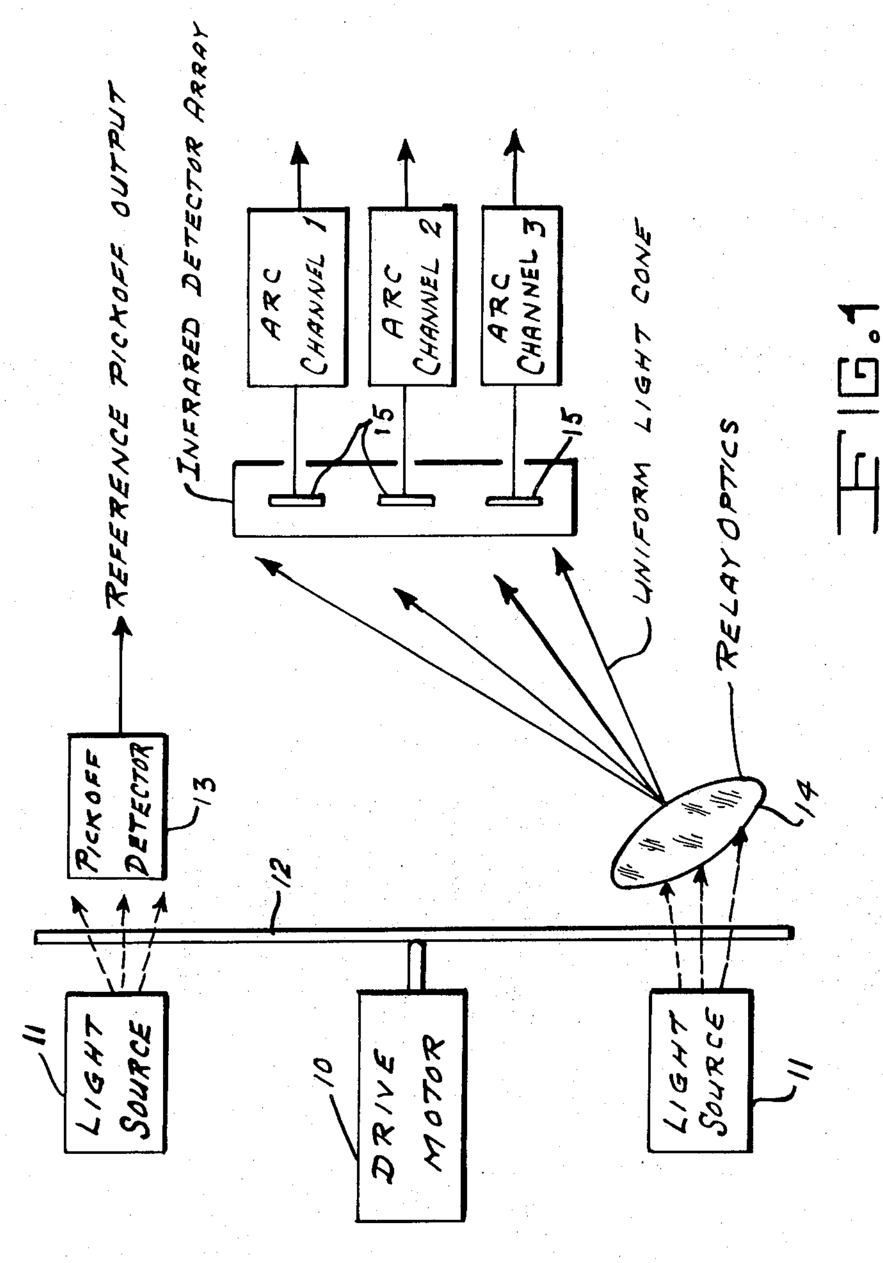
FIG. 1 is a block diagram illustrating the reference signal light source of the invention and its relationship to an infrared system detector array.
Figure 2:
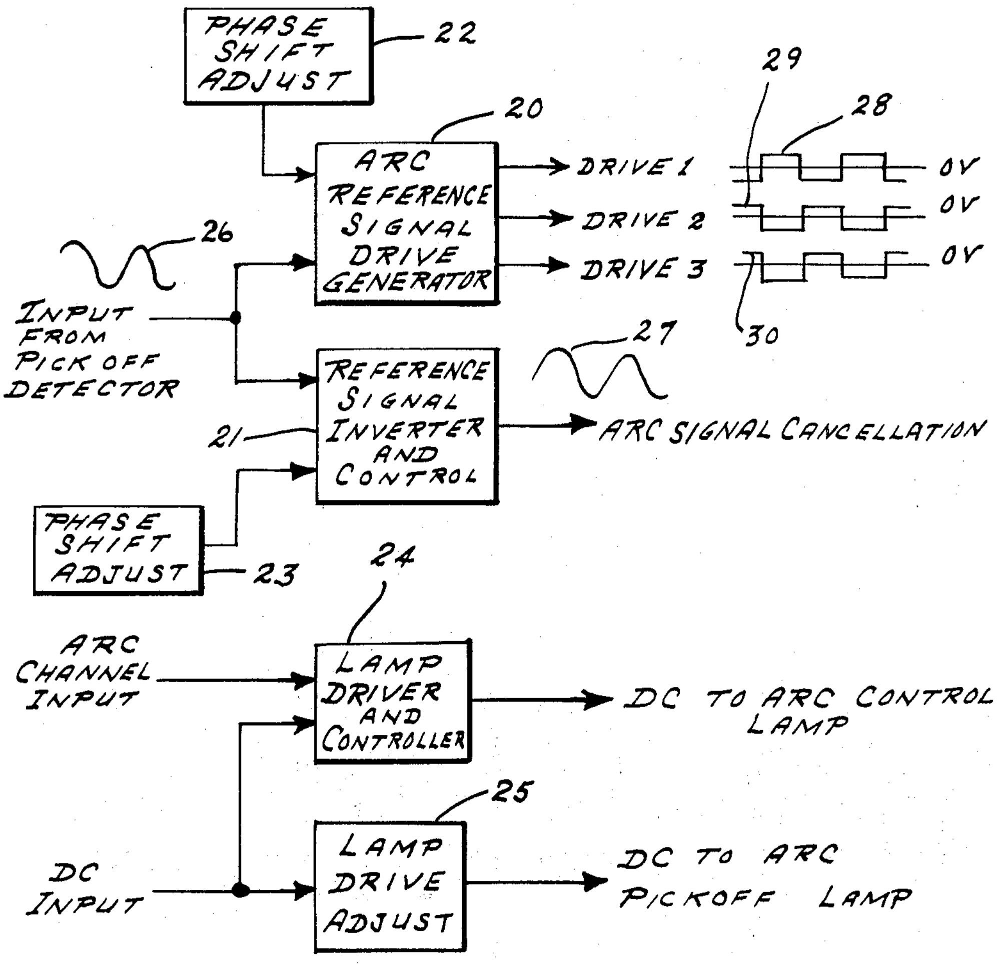
FIG. 2 is a block diagram illustrating the automatic responsivity drive circuits of the invention.

Referring now to FIG. 1, light from light source 11 is modulated by means of chopper wheel 12. Chopper wheel 12 is rotated by drive motor 10. The frequency of the reference signal derived from this modulated light is determined by the number of spokes in chopper wheel 12 and by the motor speed. The modulated light is directed on to detector elements 15 of the infrared detector array by means of relay optics 14. Detector elements 15 receive both the reference signal and incident infrared light and generates both the system reference signals and infrared video signal for transmission in their respective channels. Pickoff detector 13 receives only modulated light and its output contains only the system reference signal. The output of pickoff detector 13 (illustrated by waveform 26) is fed to reference drive generator 20 and reference signal inverter 21 as shown in FIG. 2. Phase shift adjusting means 22 and 23 are provided for drive generator 20 and inverter 21 respectively. Drive generator 20 produces square wave drive signals 28, 29 and 30 and inverter 21 provides a 180° phase shifted reference signal 27. The output of each automatic responsivity control channel is transmitted to the infrared system and to the responsivity control circuits through lamp driver 24. Lamp drive adjust 25 and a DC input voltage provided for control purposes.

Figure 3:
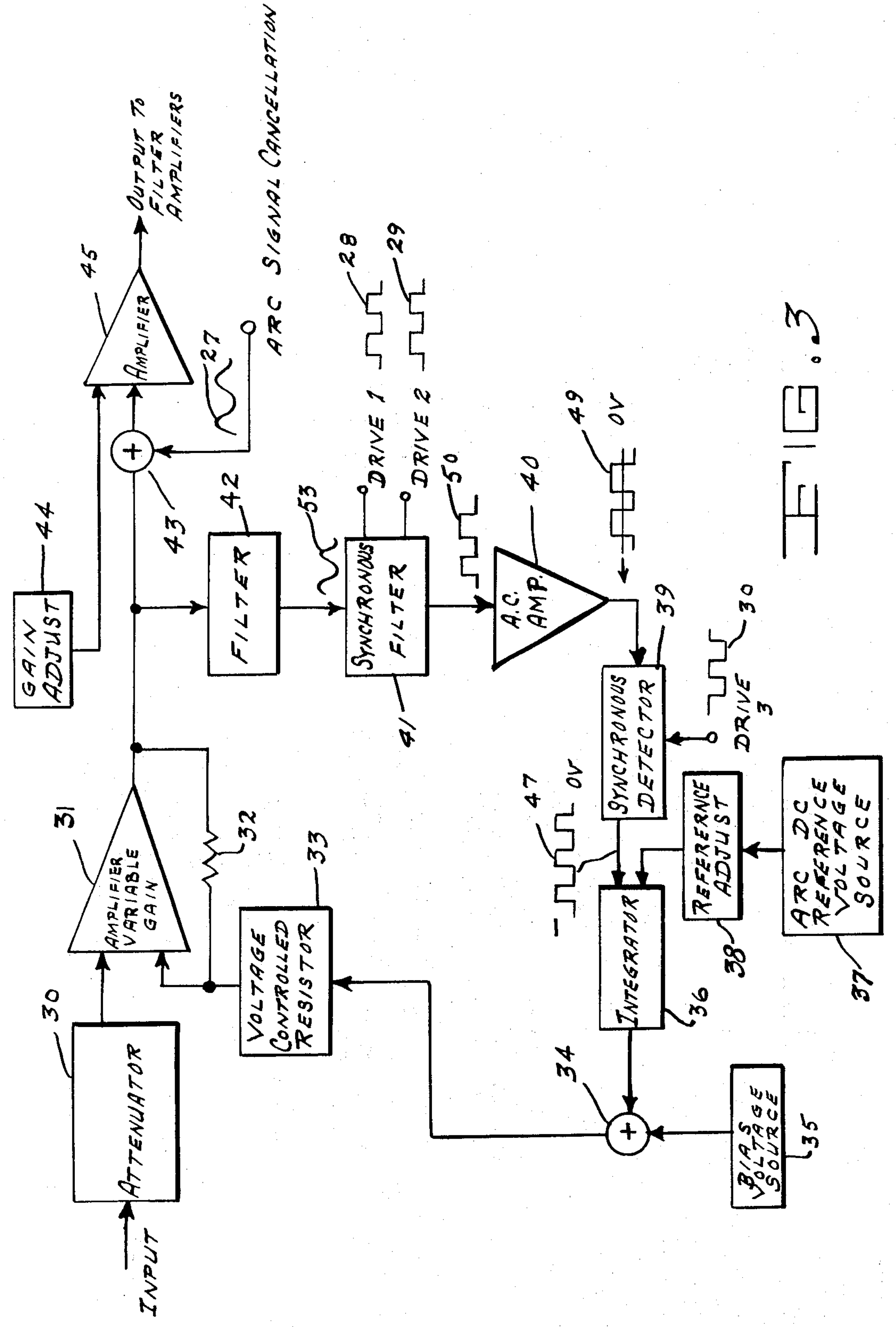
FIG. 3 is a block diagram illustrating a reference signal processing circuit for a single infrared system channel.

FIG. 3 illustrates the automatic responsivity control circuitry for a single channel. The reference signals and the infrared video signals from the preceding stage are attenuated by attenuator 30 and passed through variable gain amplifier 31. The circuit which controls the gain of variable gain amplifier 31 comprises filter 42, synchronous filter 41, AC amplifier 40, synchronous detector 39, integrator 36, signal summing means 34 and voltage controlled resistor 33. A DC reference voltage for signal comparing in integrator 36 is provided by reference voltage source 7. The voltage is adjustable by means of reference voltage adjust means 38. A bias voltage is provided by bias voltage source 35. Waveforms 53, 50, 49 and 47 illustrate the signals at various points in the circuit. The output of variable gain amplifier 31 is summed with 180° phase shifted reference signal 27 by summing means 43 and then amplified by amplifier 45. Amplifier 45 is controlled in part by gain adjusting means 44 and its output is connected to the infrared system filter amplifiers.

Figure 4:
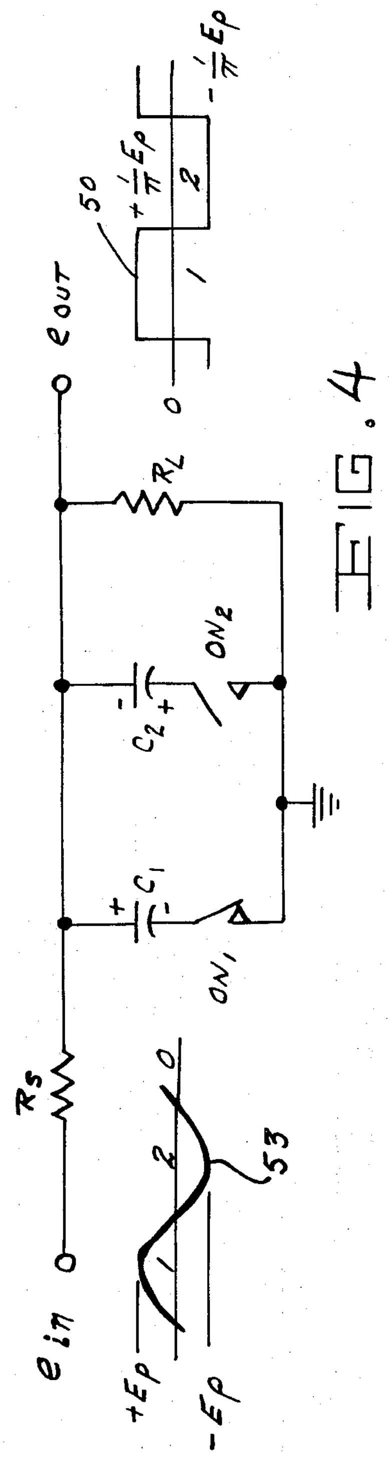
FIG. 4 is a schematic diagram of an ideal synchronous filter.
Figure 5:
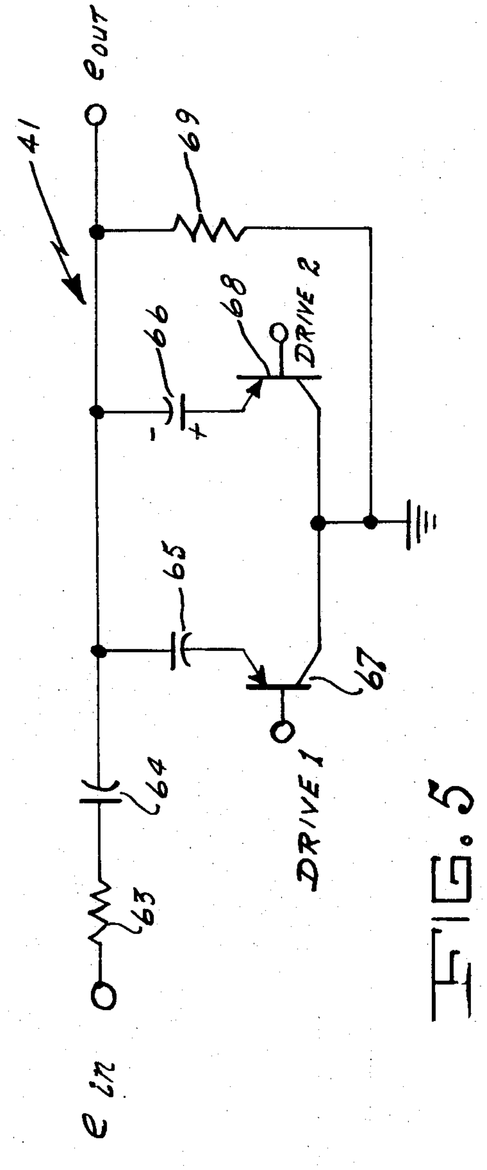
FIG. 5 is a schematic diagram of the synchronous filter used in the present invention.

FIGS. 4 and 5 illustrate, schematically, an ideal synchronous filter and the actual synchronous filter 41 used in the above described circuit. Synchronous filter 41 comprises resistors 63, 69, capacitors 64, 65, 66 and transistors 67 and 69. The bases of transistors 67 and 69 are driven by square wave reference signals 28 and 29.

In operation, the signals from the infrared system detectors (both video and reference) are passed through variable gain amplifier 31 whose gain is controlled by voltage controlled resistor 32. The reference signal is extracted from the video signals by filters 41 and 42. This output is then amplified by AC amplifier 40 and synchronously detected by synchronous detector 39. The proportional DC output voltage is then compared with the fixed DC reference voltage. The difference between these voltages is amplified by integrator 36 which is connected to the voltage controlled resistor 33. The overall gain is such that the reference signal out of the variable gain amplifier is forced within fractions of a percent to assume a voltage determined by the filter and detection efficiency, the AC amplifier gain and the fixed DC reference voltage. This signal is cancelled following the variable gain amplifier by summing it at summing means 43 with out-of-phase signal of equal amplitude (signal 27). If all channels of the system are controlled in the same manner all gains (including detector element response) will be equalized as will be the response of each processing channel to video signals with frequency spectra in the range of the reference frequency.

An important feature of the invention is the application of both the conventional and synchronous filters to extract the reference signals from the video signals. For the system illustrated a filter "Q" factor of 100 or greater is required to prevent video signals from saturating the AC amplifier 40. Such "Q"'s are easily obtainable with conventional filter techniques but the reference frequency and component tolerances required are difficult to realize. A synchronous filter (normally used in digital applications and called a digital filter) converts the sine-wave reference signal to a square output waveshape as indicated by waveforms 50, 53 of FIG. 4. The time constants of the circuit are such that many reference sine-wave cycles are required to charge capacitors $C_1$ and $C_2$. Capacitors $C_1$ and $C_2$ are switched on during the positive and negative going sinewave swings respectively. Nonsynchronous signals give no long term output and only small short term outputs. The synchronous filter has the disadvantage of accepting harmonics of the desired frequency and exhibits some image frequency defects. These disadvantages are overcome by preceding the synchronous filter by low-Q tuned LC filter 42. A Q of 5 in the tuned filter may be easily achieved with good temperature stability if the reference frequency variation is less than 1 percent. The digital filter may have Q's of greater than 300 with loose-tolerance components since its center frequency is dependent only on the switching frequency.

While the invention has been described in one presently preferred embodiment, it is understood that the words which have been used are words of description rather than words of limitation and that changes within the purview of the appended claims may be made without departing from the scope and spirit of the invention in its broader aspects.

I claim:

1. The method of equalizing the responses of signal channels in a multiple channel infrared system comprising the steps of illuminating the infrared system detector element array with a reference signal of modulated light, separately detecting said modulated light and generating therefrom multiple square wave reference signals and a 180° phase shifted reference signal, for each infrared system channel passing the infrared video signals and the reference signals generated therein through a variable gain amplifier, filtering the output of said variable gain amplifier with a synchronous filter that is responsive to said separately detected square wave reference signals, synchronously detecting the output of said synchronous filter with another of said separately detected square wave reference signals, comparing said synchronously detected output with a fixed DC reference voltage, controlling the gain of said variable gain amplifier with the difference voltage derived therefrom, and summing the channel output signal with said 180° phase shifted reference signal.

2. In combination with a multiple channel infrared detection system having a multiplicity of infrared detector elements, a high frequency automatic responsivity control system comprising a source of reference light, a reference light detector for providing a reference signal responsive to received reference light, means for illuminating said infrared detectors and said reference light detector with reference light, means for modulating the output of said source of reference light, a reference signal drive generator connected to the output of said reference light detector for generating first, second and third square wave drive signals, inverter means connected to the output of said reference light detector for providing a 180° phase inverted reference signal, an automatic responsivity control channel connected to the output of each infrared detector element; and, in conjunction with each automatic responsivity control channel a reference signal extraction circuit comprising a variable gain amplifier having an input and output connected at its input to an automatic responsivity control channel to receive infrared detection system video and reference signals, a synchronous filter having first and second transistors and an input and output connected at its input to the output of said variable gain amplifier, the bases of said first and second transistor being connected to receive, respectively, said first and second square wave drive signals, amplifier means for amplifying the output of said synchronous filter, a synchronous detector having first and second inputs and an output, said first input being connected to the output of said amplifier means and said second input being connected to receive said third square wave drive signal, a DC reference voltage source, an integrator having first and second inputs and an output, said first input being connected to the output of said synchronous detector and said second input being connected to said DC reference voltage source, a voltage controlled resistor connected to control the gain of said variable gain amplifier in response to the output of said integrator, and means for summing the output of said variable gain amplifier with the output of said inverter means.

* * * * *